(12) United States Patent  
Song et al.

(10) Patent No.: US 12,537,749 B2  
(45) Date of Patent: Jan. 27, 2026

(54) LEARNING-BASED NETWORK OPTIMIZATION SERVICE

(71) Applicant: Verizon Patent and Licensing Inc., Basking Ridge, NJ (US)

(72) Inventors: Lei Song, Basking Ridge, NJ (US); Lily Zhu, Parsippany, NJ (US); Andrew E. Youtz, Princeton, NJ (US); Jeremy Nacer, Boca Raton, FL (US); Cindy Yuexin Dong, Bridgewater, NJ (US); Edward Diaz, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 128 days.

(21) Appl. No.: 18/630,078

(22) Filed: Apr. 9, 2024

(65) Prior Publication Data

US 2025/0317364 A1    Oct. 9, 2025

(51) Int. Cl.
*H04L 41/16* (2022.01)
*H04L 41/5009* (2022.01)

(52) U.S. Cl.
CPC .......... *H04L 41/16* (2013.01); *H04L 41/5009* (2013.01)

(58) Field of Classification Search
CPC ............................ H04L 41/16; H04L 41/5009
See application file for complete search history.

(56) References Cited

U.S. PATENT DOCUMENTS

| | | | |
|---|---|---|---|
| 11,916,754 B2 | 2/2024 | Zhu et al. | |
| 12,056,644 B2* | 8/2024 | Niranjani | G06Q 10/0635 |
| 2017/0187807 A1* | 6/2017 | Clernon | H04L 67/34 |
| 2023/0075276 A1* | 3/2023 | Zhu | H04W 24/02 |
| 2023/0100253 A1* | 3/2023 | Zhu | G06N 3/0464 |
| | | | 706/26 |
| 2024/0187877 A1* | 6/2024 | Esswie | G06N 20/00 |
| 2024/0256949 A1* | 8/2024 | Conte | G06N 20/00 |
| 2024/0273314 A1* | 8/2024 | Butler | G06K 7/10099 |
| 2024/0430665 A1* | 12/2024 | Gomez | H04W 4/14 |

FOREIGN PATENT DOCUMENTS

| | | | | |
|---|---|---|---|---|
| WO | 2023/209577 | 11/2023 | | |
| WO | WO-2024165946 A1 * | 8/2024 | ......... | H04L 41/0823 |
| WO | WO-2024223570 A1 * | 10/2024 | ............ | H04W 12/45 |

* cited by examiner

*Primary Examiner* — Chris Parry
*Assistant Examiner* — Steven C Nguyen

(57) ABSTRACT

A method, an end device, and a non-transitory computer-readable storage medium are described in relation to a learning-based network optimization service. The learning-based network optimization service may include an AI/ML model pairing between an end device and a network device based on AI/ML model identifiers that may include or correlate to a radio frequency (RF) modem or chipset identifier of the end device. The AI/ML models may support entity-specific optimizations, use and sub-use cases, and network-side and end device-side key performance indicators.

20 Claims, 10 Drawing Sheets

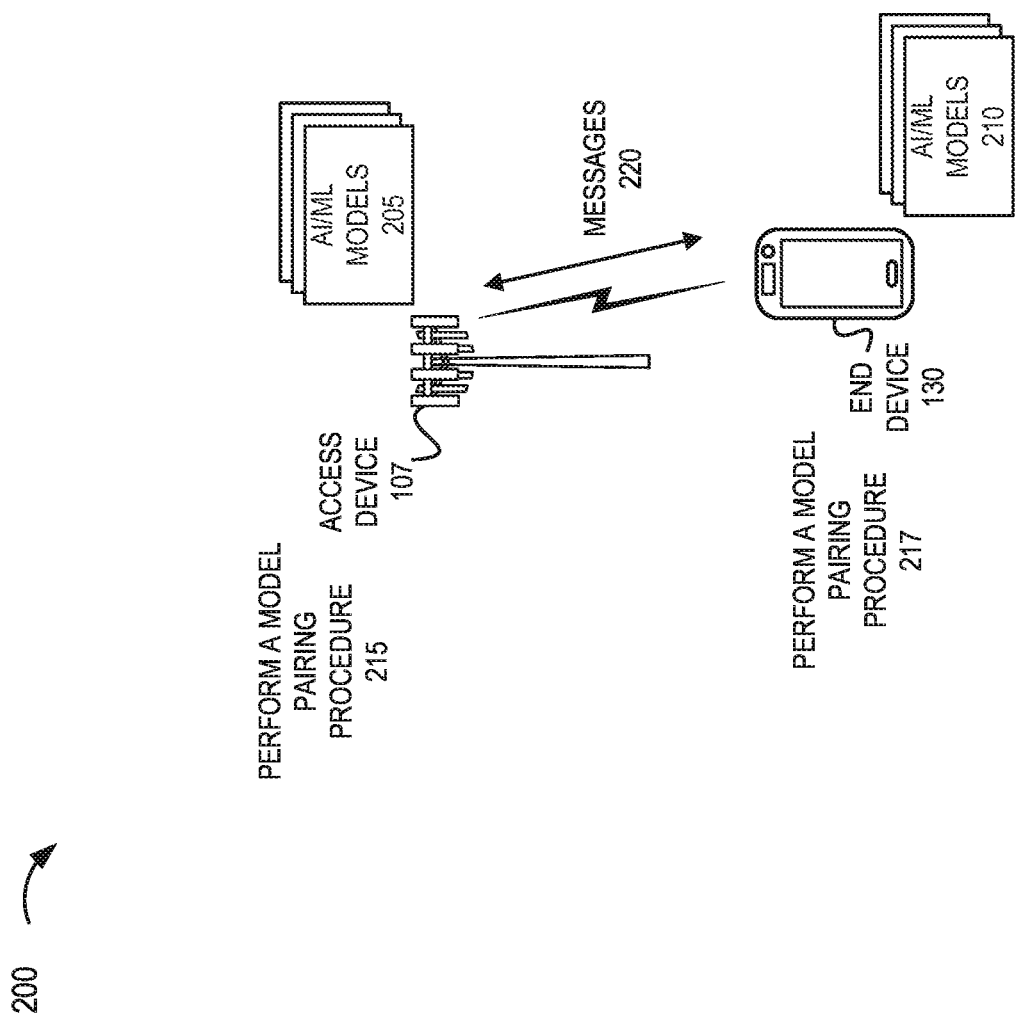

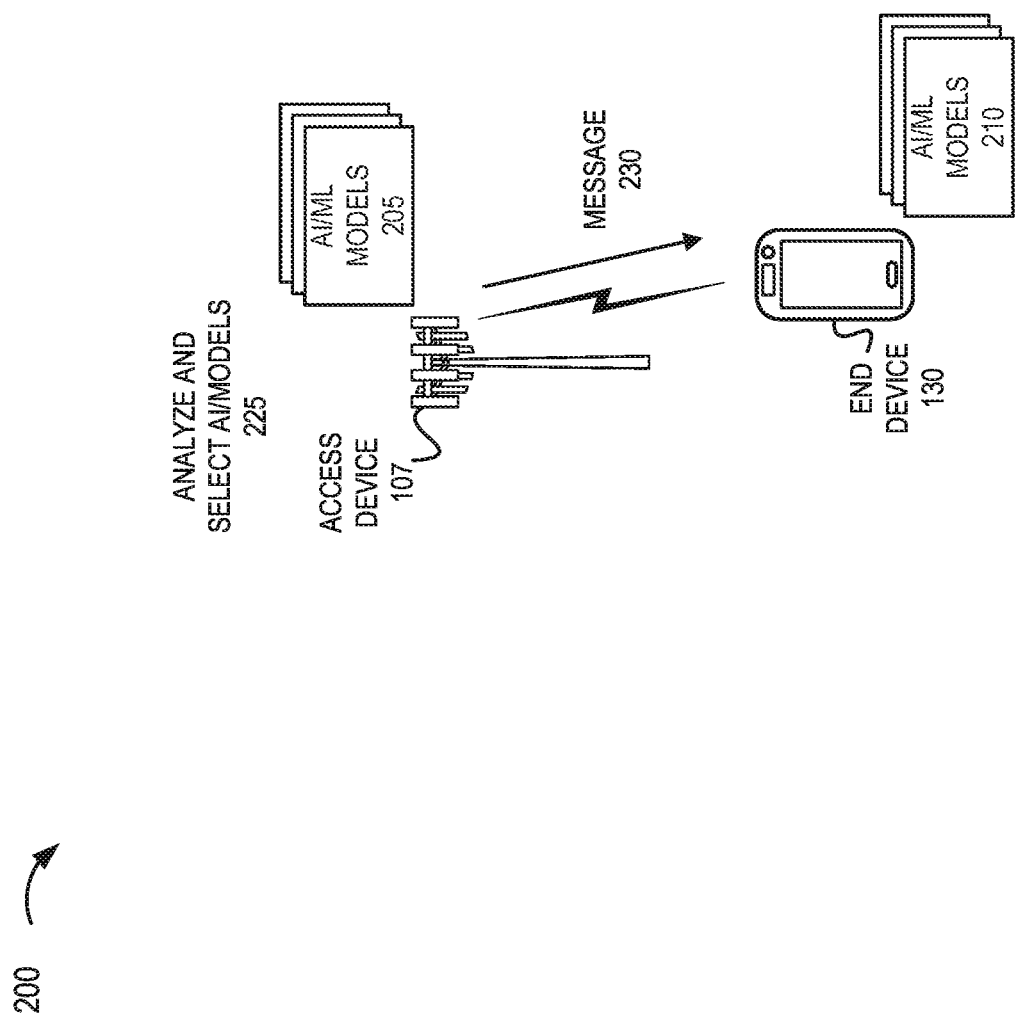

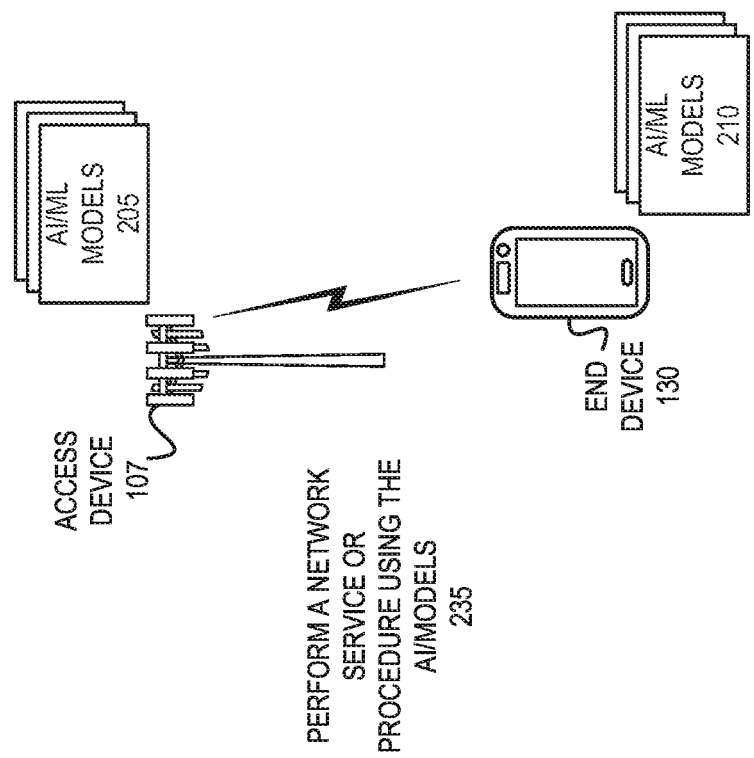

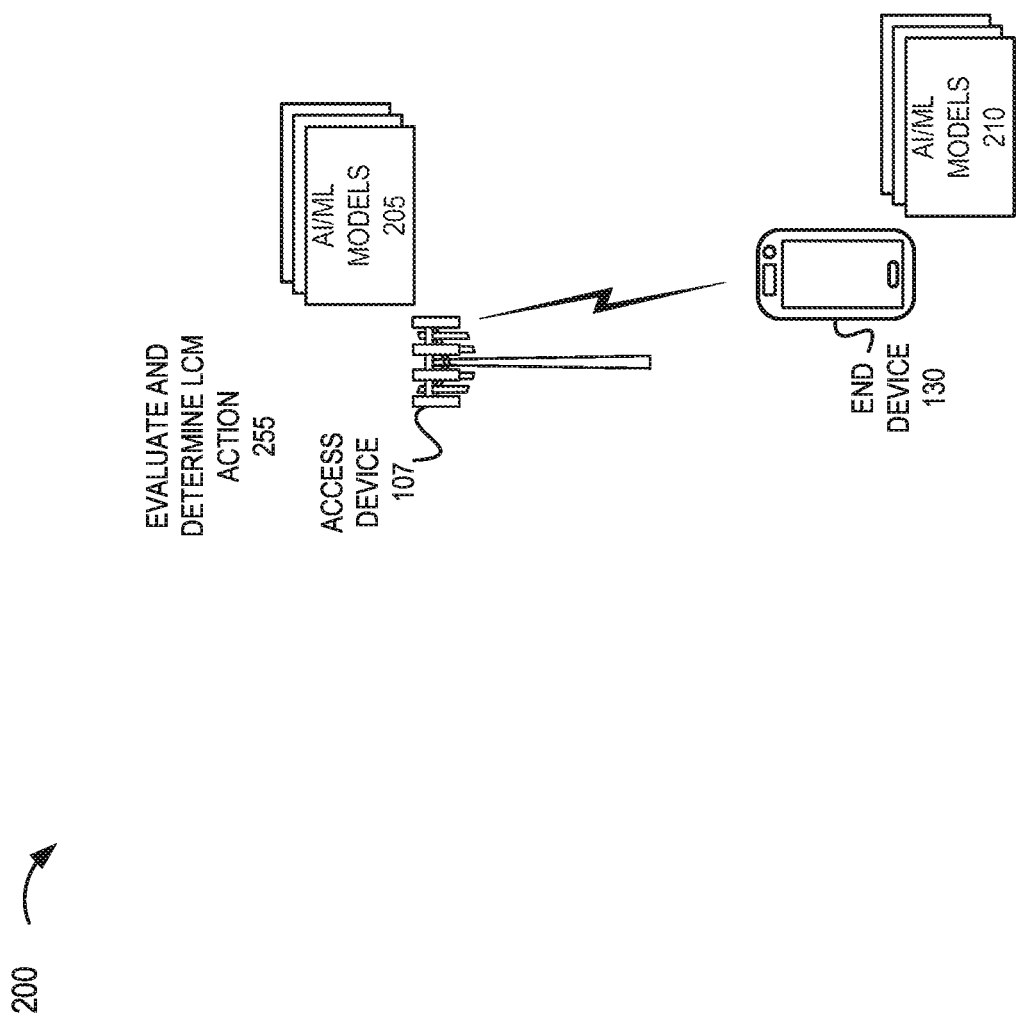

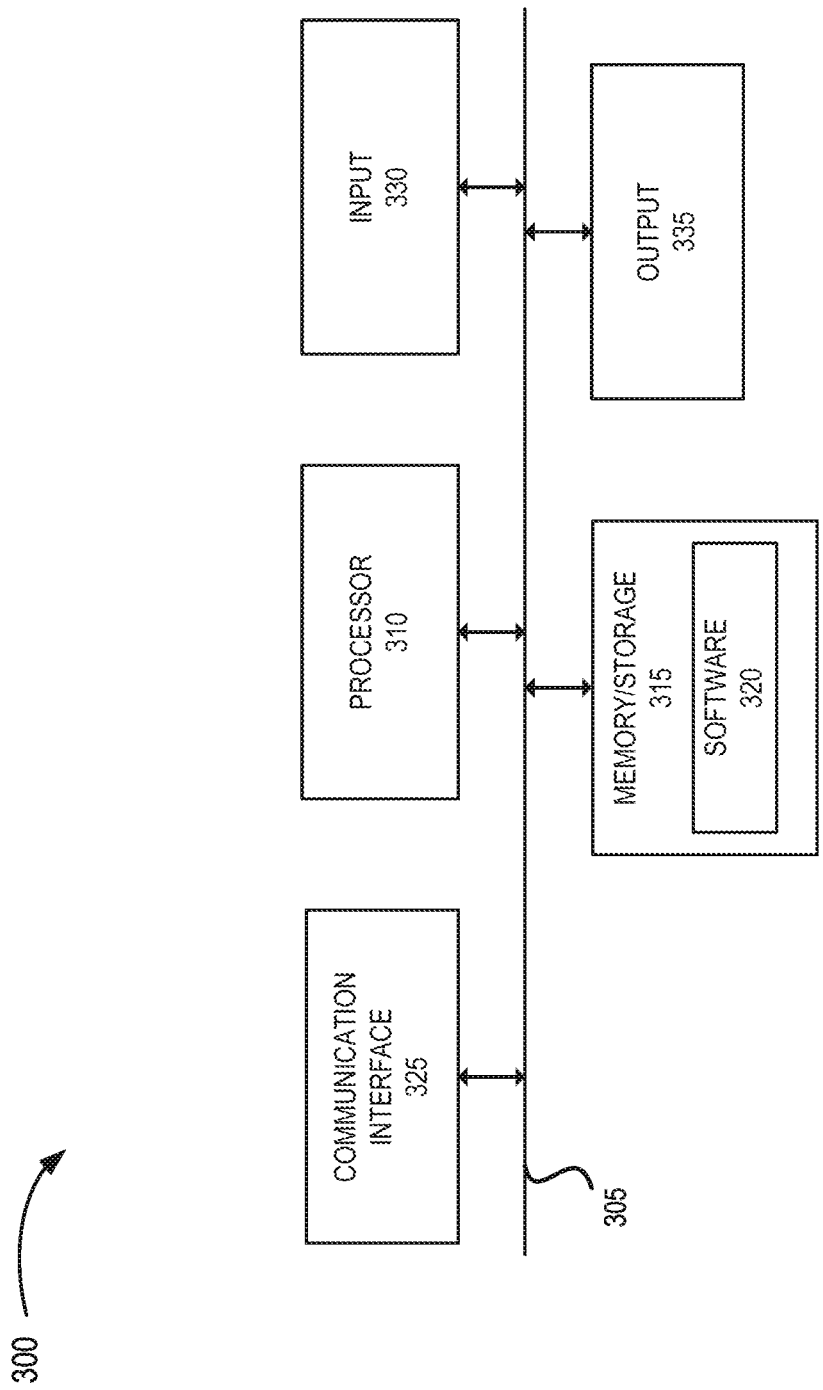

500

PERFORM AN AI/ML MODEL PAIRING PROCEDURE THAT INCLUDES USE OF AN AI/ML MODEL IDENTIFIER THAT CORRELATES TO AN RF MODEM IDENTIFIER OF AN END DEVICE
505

USE AN NETWORK AI/ML MODEL OF AN END DEVICE AND NETWORK AI/ML MODEL PAIR, SELECTED BASED ON THE AI/ML MODEL PAIRING PROCEDURE, TO PERFORM A NETWORK SERVICE, OPERATION, OR PROCEDURE
510

PERFORM AN AI/ML MODEL PAIRING PROCEDURE THAT INCLUDES USE OF AN AI/ML MODEL IDENTIFIER THAT CORRELATES TO AN RF MODEM IDENTIFIER OF AN END DEVICE
605

USE AN END DEVICE AI/ML MODEL OF AN END DEVICE AND NETWORK AI/ML MODEL PAIR, SELECTED BASED ON THE AI/ML MODEL PAIRING PROCEDURE, TO PERFORM A NETWORK SERVICE, OPERATION, OR PROCEDURE
610

Fig. 6

LEARNING-BASED NETWORK OPTIMIZATION SERVICE

BACKGROUND

Development and design of networks present certain challenges from a network-side perspective and an end device perspective. For example, Next Generation (NG) wireless networks, such as Fifth Generation New Radio (5G NR) networks are being deployed and are under development. End devices may connect to a radio access network (RAN) according to several types of configurations and may be afforded different quality of service (QoS) levels.

BRIEF DESCRIPTION OF THE DRAWINGS

FIGS. 2A-2E are diagrams illustrating an exemplary process of an exemplary embodiment of the learning-based network optimization service may be implemented;

FIG. 3 is a diagram illustrating exemplary components of a device that may correspond to one or more of the devices illustrated and described herein;

FIG. 5 is a flow diagram illustrating another exemplary process of an exemplary embodiment of the learning-based network optimization service; and FIG. 6 is a flow diagram illustrating yet another exemplary process of an exemplary embodiment of the learning-based network optimization service.

DETAILED DESCRIPTION

Figure 1:
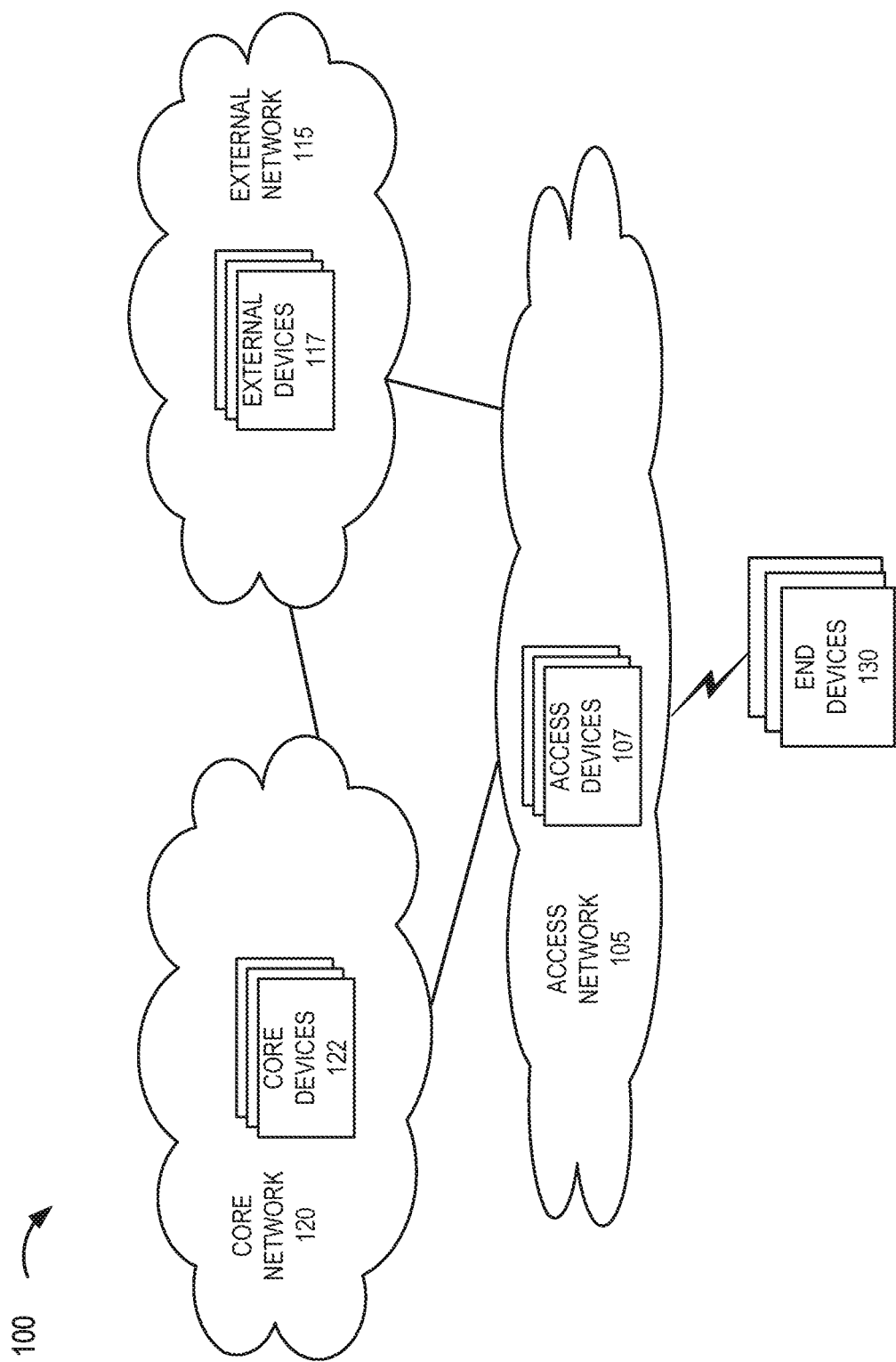
FIG. 1 is a diagram illustrating an exemplary environment in which an exemplary embodiment of a learning-based network optimization service may be implemented.

The following detailed description refers to the accompanying drawings. The same reference numbers in different drawings may identify the same or similar elements. Also, the following detailed description does not limit the invention.

The application of artificial intelligence and/or machine learning (AI/ML) in a wireless network, such as a 5G wireless network and/or a future generation wireless network (e.g., 5G-Advanced, Sixth Generation (6G), Seventh Generation (7G), etc.), is under development. For example, AI/ML may be used to provide optimizations in a radio access network (RAN). By way of further example, an AI/ML model may be directed to various network functions, operations, performance-related processes and/or use cases, such as load balancing, mobility optimization, network energy saving, channel state information (CSI), beam management, among other facets of a wireless network. Network standardizing bodies, such as Third Generation Partnership Project (3GPP), 3GPP2, International Telecommunication Union (ITU), European Telecommunications Standards Institute (ETSI), GSM Association (GSMA), or the like may develop standards for mechanisms of the AI/ML model, such as input, output, feedback, inference and prediction, retraining to achieve higher inference accuracy, optimization, failure prevention, and other aspects of life cycle management (LCM) (e.g., activation, deactivation, switching, fallback, monitoring, etc.).

In a multi-vendor, multi-network operator, and the like wireless network environment, however, the use of AI/ML should also enable entity-specific configurations, optimizations, key performance indicators (KPIs), use cases, and the like (e.g., in contrast to standardized-specific configurations, optimizations, etc.) to be applied to a wireless service between end devices and a wireless network, such as the RAN. For example, end devices may be configured with a specific chipset (e.g., a radio frequency (RF) hardware, baseband hardware, application-specific integrated circuit (ASIC), etc.) and/or firmware/software release (e.g., digital signal processing (DSP), protocol stack, etc.), which in turn may afford certain capabilities that effect various aspects of wireless connectivity, such as carrier aggregation (CA), dual connectivity (DC), cell selection/reselection, power conservation, and the like. Additionally, or alternatively, a network device of the wireless network may include AI/ML models directed to standardized-specific configurations, etc., but should also include entity-specific AI/ML models that may provide a complement to the specific end device capabilities. Additionally, or alternatively, the end device may include AI/ML models directed to standardized-specific configurations, etc., but may also include an entity-specific AI/ML model that may provide a complement to the AI/ML models of the network device of the wireless network. In this way, the end device and the wireless network may operate in a manner that may optimize certain network operations, scenarios, use cases, sub-use cases, configurations, KPIs (e.g., network-side, end device-side, etc.), Quality of Experience (QoE), mean opinion score (MOS), service level agreement (SLA) parameters and values, and the like according to entity-specific optimizations and standardized optimizations.

According to exemplary embodiments, a learning-based network optimization service is described. According to an exemplary embodiment, the learning-based network optimization service may be applied to 5G wireless networks, future generation wireless networks (e.g., 5G-Advanced, 6G, 7G, etc.), and legacy wireless networks (e.g., Fourth Generation (4G) networks, etc.). For example, the learning-based network optimization service may be applied to the access network (e.g., a RAN), other portions of the network (e.g., core network, X-haul network, etc.), and/or external networks (e.g., application service layer networks), as described herein. According to an exemplary embodiment, the learning-based network optimization service may be applied to end devices, as described herein.

According to various exemplary embodiments, the learning-based network optimization service may use a one-sided AI/ML framework (e.g., network-side or end device-side) and/or a two-sided AI/ML framework (e.g., network-side and end device-side). According to an exemplary embodiment, the learning-based network optimization service may include entity-specific, proprietary, or non-standardized AI/ML models (simply referred to as entity-specific AI/ML models or AI/ML models) that may provide functionalities, optimizations, support LCM of the entity-specific AI/ML models, customized use and sub-use cases, tailored KPIs, QoEs, and the like, based on the capabilities of the RF modem hardware and firmware/software version of the end device on a per end device basis. For the sake of description, entity-specific AI/ML models are distinctive from, for example, standardized AI/ML models, LCM, optimization, functionalities, KPIs, QoEs, etc., promulgated by the network standardizing bodies and not based on a per end device basis, as described herein. The entity-specific AI/ML model may relate to a particular entity, such as a network operator, a vendor, or another entity that is distinctive from a standardized AI/ML model associated with a network standards entity.

According to an exemplary embodiment, the learning-based network optimization service may include AI/ML model identifiers that identify the entity-specific AI/ML models, as described herein. For example, a network-side AI/ML model identifier may identify a network-side AI/ML model and associated network side structure, configuration, and the like. Likewise, an end device-side AI/ML model identifier may identify an end device-side AI/ML model and associated end device structure, configuration, functionality, and the like. According to an exemplary embodiment, the end device-side AI/ML model identifier and/or the network side AI/ML model identifier may correlate to an RF modem identifier of the end device, as described herein. Alternatively, the end device-side AI/ML model identifier and/or the network side AI/ML model identifier may include the RF modem identifier of the end device, as described herein. According to an exemplary embodiment, the RF modem identifier may identify a chipset/hardware and software and/or firmware release information (e.g., version, etc.) pertaining to the RM modem of the end device. According to various exemplary embodiments, the end device may store or be configured with one or multiple RF modems (e.g., different software and/or firmware versions). According to various exemplary embodiments, the AI/ML models may correlate to the RF modem according to one-to-one relationship or a one-to-many relationship.

According to an exemplary embodiment, the learning-based network optimization service may include other types of identifiers, such as a radio head (RH) identifier pertaining to a RAN device, chipset sub-function identifiers (e.g., relating to functionalities associated with carrier aggregation (CA), power saving, dual connectivity (DC), multiple input multiple output (MIMO), and/or other wireless connectivity-related functionalities), and RAN device sub-function identifiers (relating to CA, DC, MIMO, beamforming, etc.). The learning-based network optimization service may utilize the identifiers for performing a model pairing service, as described herein.

According to an exemplary embodiment, the learning-based network optimization service may store AI/ML service information that includes correlations between identifiers. The correlations may also include correlations relating to certain configurations, optimizations, KPIs, QoEs, use cases, sub-use cases, etc., as described herein.

According to an exemplary embodiment, the learning-based network optimization service may include a model pairing service or procedure between the wireless network and the end device, as described herein. According to an exemplary embodiment, the model pairing service may include use of the correlation or inclusion of the chipset identifier, the RF modem identifier, or the like of the end device and the AI/ML model identifier. For example, the model pairing service may use the identifiers as a basis for AI/ML model selection and use as well as other features of the learning-based network optimization service, as described herein. The AI/ML model identifier may relate to a network-side AI/ML model, an end device-side AI/ML model, or both. The model pairing service may include use of other information, such as AI/ML model performance information, use case and/or sub-use case, and/or other information of relevance, as described herein. According to an exemplary embodiment, the model pairing service may include an AI/ML model that selects the AI/ML model(s) to be used.

The model pairing procedure may be supported by communication between the end device and the wireless network via messaging, signaling, or the like, as described herein. According to various exemplary embodiments, customized control information may be communicated between the end device and the wireless network via various control plane messages, such as a system information block (SIB) message, a non-access stratum (NAS) message, a Radio Resource Control (RRC) message, downlink control information (DCI), a Medium Access Control (MAC)-Control Element (CE), uplink control information (UCI), or the like, as described herein. The learning-based network optimization service may implement the customized control information to include a network operator bit, an information elements (IE), an attribute value (AV) pair, a field, and/or use of another form of data.

According to an exemplary embodiment, the learning-based network optimization service may include AI/ML models/algorithms relating to entity-specific CSI reporting, beam management, end device positioning, end device mobility, network energy saving, load balancing, handover, and other types of network and/or end device procedures and aspects associated with wireless connectivity and wireless service. In this way, the learning-based network optimization service may provide an operator-controlled AI/ML framework, for example.

According to exemplary embodiment, the learning-based network optimization service may specify and manage data collection (e.g., variables, parameters, parameter values, measurements, etc.), train and update AI/ML models, define optimizations, functionalities, KPIs, use and/or sub-use cases, and other types of LCM actions and factors of relevance to an AI/ML framework, as described herein. According to various exemplary embodiments, LCM actions may be performed at the end device-side and/or network-side for their respective AI/ML models, as described herein. For example, the learning-based network optimization service may support end device-assisted selection of the end device-side AI/ML model (e.g., collaborative between the end device and the network) or end device-based (e.g., end device performs an LCM action, such as selection of the end device-side AI/ML model and informs the network, etc.). Similarly, the network may be configured for network-based, network-assisted, network controlled (e.g., network selects both network-side and end device-side AI/ML models), and/or other hybrid frameworks relating to LCM and the AI/ML models, as described herein.

In view of the foregoing, the learning-based network optimization service may improve network and end device performance based on per end device-side capabilities (e.g., chipset and other logic) and per network-side capabilities across an array of network and end device procedures, operations, use cases, sub-use cases, functionalities, and so forth.

FIG. 1 is a diagram illustrating an exemplary environment 100 in which an exemplary embodiment of the learning-based network optimization service may be implemented. As illustrated, environment 100 includes an access network 105, an external network 115, and a core network 120. Access network 105 includes access devices 107 (also referred to individually or generally as access device 107). External network 115 includes external devices 117 (also referred to individually or generally as external device 117). Core network 120 includes core devices 122 (also referred to individually or generally as core device 122). Environment 100 further includes end devices 130 (also referred to individually and generally as end device 130).

The number, type, and arrangement of networks illustrated in environment 100 are exemplary. For example, according to other exemplary embodiments, environment 100 may include fewer networks, additional networks, and/or different networks. For example, according to other exemplary embodiments, other networks not illustrated in FIG. 1 may be included, such as an X-haul network (e.g., backhaul, mid-haul, fronthaul, etc.), a transport network, or another type of network that may support a wireless service and/or an end device application service, as described herein.

A network device, a network element, or a network function (referred to herein simply as a network device) may be implemented according to one or multiple network architectures, such as a client device, a server device, a peer device, a proxy device, a cloud device, and/or a virtualized network device. Additionally, a network device may be implemented according to various computing architectures, such as centralized, distributed, cloud (e.g., elastic, public, private, etc.), edge, fog, and/or another type of computing architecture, and may be incorporated into distinct types of network architectures (e.g., Software Defined Networking (SDN), client/server, peer-to-peer, etc.) and/or implemented with various networking approaches (e.g., logical, virtualization, network slicing, etc.). The number, the type, and the arrangement of network devices are exemplary.

Environment 100 includes communication links between the networks and between the network devices. Environment 100 may be implemented to include wired, optical, and/or wireless communication links. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number, type, and arrangement of communication links illustrated in environment 100 are exemplary.

Environment 100 may include various planes of communication including, for example, a control plane, a user plane, a service plane, and/or a network management plane. Environment 100 may include other types of planes of communication. A message communicated in support of the learning-based network optimization service may use at least one of these planes of communication.

Access network 105 may include one or multiple networks of one or multiple types and technologies. For example, access network 105 may be implemented to include a 5G RAN, a future generation RAN (e.g., 6G RAN, a 7G RAN, or a subsequent generation RAN), a centralized-RAN (C-RAN), an Open-RAN (O-RAN), and/or another type of access network. Access network 105 may include a legacy RAN (e.g., a Third Generation (3G) RAN, a Fourth Generation (4G) RAN, etc.). Access network 105 may communicate with and/or include other types of access networks, such as, for example, a Wi-Fi network, a local area network (LAN), a Citizens Broadband Radio System (CBRS) network, a cloud RAN, a virtualized RAN (vRAN), a self-organizing network (SON), a wired network (e.g., optical, cable, etc.), or another type of network that provides access to or can be used as an on-ramp to access network 105.

According to some exemplary embodiments, access network 105 may be implemented to include various architectures of wireless service, such as, for example, macrocell, microcell, femtocell, picocell, metrocell, NR cell, Long Term Evolution (LTE) cell, non-cell, or another type of wireless architecture. Additionally, according to various exemplary embodiments, access network 105 may be implemented according to various wireless technologies (e.g., radio access technologies (RATs), etc.), and various wireless standards, frequencies, bands, and segments of radio spectrum (e.g., centimeter (cm) wave, millimeter (mm) wave, below 6 gigahertz (GHz), above 6 GHz, higher than mm wave, C-band, licensed radio spectrum, unlicensed radio spectrum, above mm wave), and/or other attributes or technologies used for radio communication. According to some exemplary embodiments, access network 105 may be implemented to include various wired and/or optical architectures for wired and/or optical access services.

Depending on the implementation, access network 105 may include one or multiple types of network devices, such as access devices 107. For example, access device 107 may include a gNB, an enhanced Long Term Evolution (eLTE) evolved Node B (eNB), an eNB, a radio network controller (RNC), a radio intelligent controller (RIC), a base station controller (BSC), a remote radio head (RRH), a baseband unit (BBU), a radio unit (RU), a remote radio unit (RRU), a centralized unit (CU), a CU-control plane (CP), a CU-user plane (UP), a distributed unit (DU), a small cell node (e.g., a picocell device, a femtocell device, a microcell device, a home eNB, a home gNB, etc.), an open network device (e.g., O-RAN Centralized Unit (O-CU), O-RAN Distributed Unit (O-DU), O-RAN next generation Node B (O-gNB), O-RAN evolved Node B (O-eNB)), a 5G ultra-wide band (UWB) node, a future generation wireless access device (e.g., a 6G wireless station, a 7G wireless station, or another generation of wireless station), or another type of wireless node (e.g., a WiFi device, a hotspot device, a fixed wireless access customer premises equipment (FWA CPE), etc.) that provides a wireless access service. Additionally, access devices 107 may include a wired and/or an optical device (e.g., modem, wired access point, optical access point, Ethernet device, multiplexer, etc.) that provides network access and/or transport service.

According to an exemplary embodiment, at least some of access devices 107 include logic of the learning-based network optimization service, as described herein. For example, a gNB, an eNB, a RIC, a future generation wireless station, a DU, a CU, or the like may include logic of the learning-based network optimization service, as described herein. The logic of the learning-based network optimization service may include the model pairing service and entity-specific AI/ML models that provide support for network and end device procedures, operations, optimizations, use and/or sub-use cases, KPIs, QoEs, etc., based on a per end device capabilities basis, as described herein.

According to some exemplary embodiments, at least some of access devices 107 may include components that support AI/ML model training. For example, access devices 107 may include Operation and Maintenance (OAM) devices, a network management system (NMS), or the like relating to an AI/ML framework and associated functionalities, such as data collection, model training, model management, performance monitoring, model inference, and/or model storage. According to other exemplary embodiments, AI/ML framework components, in whole or in part, may be implemented as external device 117, core device 122, and/or a network device of another type of network or system.

External network 115 may include one or multiple networks of one or multiple types and technologies that provide an end device application service. For example, external network 115 may be implemented using one or multiple technologies including network function virtualization (NFV), SDN, cloud computing, Infrastructure-as-a-Service (IaaS), Platform-as-a-Service (PaaS), Software-as-a-Service (SaaS), or another type of network technology. External network 115 may be implemented to include a cloud network, a private network, a public network, a multi-access edge computing (MEC) network, a fog network, the Internet, a packet data network (PDN), a service provider network, the World Wide Web (WWW), an Internet Protocol Multimedia Subsystem (IMS) network, a Rich Communication Service (RCS) network, a virtual network, a packet-switched network, a data center, a data network, or other type of application service layer network that may provide access to and may host an end device application service.

Depending on the implementation, external network 115 may include various network devices such as external devices 117. For example, external devices 117 may include virtual network devices (e.g., virtualized network functions (VNFs), servers, host devices, application functions (AFs), application servers (ASs), server capability servers (SCSs), containers, hypervisors, virtual machines (VMs), pods, network function virtualization infrastructure (NFVI), and/or other types of virtualization elements, layers, hardware resources, operating systems, engines, etc.) that may be associated with application services for use by end devices 130. By way of further example, external devices 117 may include mass storage devices, data center devices, NFV devices, SDN devices, cloud computing devices, platforms, and other types of network devices pertaining to various network-related functions (e.g., security, management, charging, billing, authentication, authorization, policy enforcement, development, etc.). Although not illustrated, external network 115 may include one or multiple types of core devices 122, as described herein.

External devices 117 may host one or multiple types of end device application services. For example, the end device application service may pertain to broadband services in dense areas (e.g., pervasive video, smart office, operator cloud services, video/photo sharing, etc.), broadband access everywhere (e.g., 50/100 Mbps, ultra-low-cost network, etc.), enhanced mobile broadband (eMBB), higher user mobility (e.g., high speed train, remote computing, moving hot spots, etc.), Internet of Things (IoT) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, communication services (e.g., email, text (e.g., Short Messaging Service (SMS), Multimedia Messaging Service (MMS), etc.), massive machine-type communications (mMTC), voice, video calling, video conferencing, instant messaging), video streaming, fitness services, navigation services, and/or other types of wireless and/or wired application services. External devices 117 may also include other types of network devices that support the operation of external network 115 and the provisioning of application services, such as an orchestrator, an edge manager, an operations support system (OSS), a local domain name system (DNS), registries, and/or external devices 117 that may pertain to various network-related functions (e.g., security, management, charging, billing, authentication, authorization, policy enforcement, development, etc.). External devices 117 may include non-virtual, logical, and/or physical network devices.

Core network 120 may include one or multiple networks of one or multiple network types and technologies. Core network 120 may include a complementary network of access network 105. For example, core network 120 may be implemented to include a 5G core network, an evolved packet core (EPC) network of an LTE network, an LTE-Advanced (LTE-A) network, and/or an LTE-A Pro network, a future generation core network (e.g., a 5.5G, a 6G, a 7G, or another generation of core network), and/or another type of core network.

Depending on the implementation of core network 120, core network 120 may include diverse types of network devices that are illustrated in FIG. 1 as core devices 122. For example, core devices 122 may include a user plane function (UPF), a Non-3GPP Interworking Function (N3IWF), an access and mobility management function (AMF), a session management function (SMF), a unified data management (UDM), a unified data repository (UDR), an authentication server function (AUSF), a security anchor function (SEAF), a network exposure function (NEF), a network slice selection function (NSSF), a network repository function (NRF), a policy control function (PCF), a network data analytics function (NWDAF), a service capability exposure function (SCEF), a lifecycle management (LCM) device, a mobility management entity (MME), a packet data network (PDN) gateway (PGW), an enhanced packet data gateway (ePDG), a serving gateway (SGW), a home agent (HA), a General Packet Radio Service (GPRS) support node (GGSN), a home subscriber server (HSS), an authentication, authorization, and accounting (AAA) server, a policy and charging rules function (PCRF), a policy and charging enforcement function (PCEF), and/or a charging system (CS).

End device 130 may include a device that may have computational and communication capabilities (e.g., wireless, wired, optical, etc.). End device 130 may be implemented as a mobile device, a portable device, a stationary device (e.g., a non-mobile device and/or a non-portable device), a device operated by a user, or a device not operated by a user. For example, end device 130 may be implemented as a smartphone, a mobile phone, a personal digital assistant, a tablet, a netbook, a wearable device (e.g., a watch, glasses, headgear, a band, etc.), a computer, a gaming device, an IoT device, a drone, or another type of UE.

End device 130 may be configured to execute various types of software (e.g., applications, programs, etc.). The number and the types of software may vary among end devices 130. For example, end device 130 may host one or multiple end device applications that may relate to various types of application services described in relation to external devices 117. For example, the end device application may pertain to IoT, extreme real-time communications, gaming, voice, video-calling, navigation, ultra-reliable communications, and so forth. The end device application may include a client-side application.

End device 130 may include "edge-aware" and/or "edge-unaware" application service clients. For purposes of description, end device 130 is not considered a network device. End device 130 may be implemented as a virtualized device in whole or in part.

According to an exemplary embodiment, end device 130 may include logic of the learning-based network optimization service. For example, the logic of the learning-based network optimization service may include the model pairing service and entity-specific AI/ML models that provide support for network and end device procedures, operations, optimizations, use and/or sub-use cases, KPIs, QoEs, etc., based on a per end device capabilities basis, as described herein.

FIGS. 2A-2E are diagrams illustrating another exemplary environment and an exemplary process 200 of an exemplary embodiment of the learning-based network optimization service. As illustrated, the environment includes access device 107. According to this exemplary scenario, access device 107 may be implemented as a gNB, a DU, a CU, or a future generation wireless station or a future generation split RAN device, for example. As further illustrated, the environment includes end device 130. The number and arrangement of access device 107 and end device 130 are exemplary.

Access device 107 includes AI/ML models 205 and end device 130 includes AI/ML models 210. Although not illustrated, access device 107 and end device 130 may each store other AI/ML service information that supports the learning-based network optimization service, such as AI/ML model identifiers, RF modem identifiers, model performance information (e.g., AI/ML model scoring, KPI values, etc.), LCM information (e.g., activated, deactivated, etc.), AI/ML models supported (e.g., end device 130 may store information indicating network AI/ML models supported, access device 107 may store information indicating end device AI/ML models supported, etc.), and/or other types of AI/ML service information (e.g., use case information, sub-use case information, network operation/procedure identifiers, entity-specific optimizations, etc., which may correlate to the AI/ML models). According to other exemplary embodiments, AI/ML models 205 may reside elsewhere in access network 105 or in core network 120. According to various exemplary embodiments, AI/ML models 210 may include one or multiple sets of AI/ML models that correspond to or configured according to one or multiple RF modems of end device 130, such as one or multiple RF modem software/firmware versions, and the like.

Referring to FIG. 2A, as illustrated, access device 107 may perform a model pairing procedure 215 and end device 130 may perform a model pairing procedure 217. As a part of model pairing procedures 215/217, messages 220 between access device 107 and end device 130 may be communicated. Messages 220 may include one or multiple instances and/or types of end device-side AI/ML service information and network-side AI/ML service information, as described herein.

According to an exemplary embodiment, access device 107 may transmit (e.g., broadcast) a SIB message that includes information indicating AI/ML models that are supported. For example, the SIB message may be implemented as a SIB1 message. According to other examples, the SIB message may be another type of SIB message (e.g., SIB2, SIB3, etc.), an on-request system information (SI) message, or a new SIB message (e.g., relative to a network standard SIB message, such as 3GPP SIB message, etc.). The SIB1 or the another type of SIB message may add a bit, an IE, an AV pair, etc., to such a message and/or use a reserved bit, etc., of the message to communicate AI/ML service information to end device 130, as described herein.

According to other exemplary embodiments, access device 107 may transmit other types of messages, such as an RRC message (e.g., RRC Connection Setup message, RRC Connection Reconfiguration message, etc.), or other types of control plane messaging or signaling, as described herein. According to an exemplary embodiment, end device 130 may transmit an RRC message, an SI request message, and/or another type of control plane message or signaling to access device 107, as described herein to communicate AI/ML service information.

According to various exemplary embodiments, the model pairing service may be invoked or initiated as a part of initially establishing an RRC connection, after an RRC connection has been established, as a part of an a packet data unit (PDU) session establishment procedure, as a part of a core network registration procedure, during other times of connectivity between end device 130 and the network (e.g., access network 105, external network 115, core network 120), and/or during other types of network procedures or operations (e.g., a handover procedure, a cell selection/reselection procedure, tracking area update (TAU) procedure, etc.) in which control plane signaling may be used to communicate AI/ML service information and/or support the learning-based network optimization service.

According to an exemplary embodiment of a two-sided model framework, access device 107 may receive AI/ML service information (e.g., AI/ML model identifiers, use cases/sub-use cases supported, KPI values associated with the AI/ML models or AI/ML model identifiers, preference for network-side AI/ML model identifiers, performance or scoring information relating to each network-side AI/model or AI/ML model identifier, etc.) from end device 130. According to an exemplary embodiment, the AI/ML model identifier from end device 130 may correlate to an RF modem or RF modem identifier of end device 130. According to another exemplary embodiment, the AI/ML model identifier from end device 130 may include an RF modem identifier. As described herein, the RF modem identifier may identify hardware/chipset of the RF modem and software/firmware version information. According to some exemplary embodiment, the AI/ML model identifier may include an identifier that identifies an AI/ML model and an RF modem identifier. According to other exemplary embodiment, the AI/ML model identifier may identify an AI/ML model and correlate or be used to infer the RF modem or the RF modem identifier of end device 130. According to an exemplary scenario, as a part of a configuration procedure for end device 130, when software and/or firmware of the RF modem is updated, end device 130 may update one or multiple AI/ML models and corresponding one or multiple AI/ML model identifiers. In this way, the AI/ML model identifier may correlate to the RF modem or the RF modem identifier, as described herein. Similarly, as described, end device 130 may receive AI/ML service information via the SIB message and/or another type of control plane message or signaling, as described herein.

Referring to FIG. 2B, access device 107 may analyze and select 225 the AI/ML model(s) to use. Access device 107 may communicate the selected AI/ML model(s) to use to end device 130 via a message 230. According to an exemplary embodiment, as a part of the analysis and selection process, access device 107 may evaluate the performance of corresponding and complementary AI/ML models of the network-side and end device-side as a basis for selection based on the end device capabilities (e.g., including RF modem identifier and software version). For example, a poorly performing entity-specific AI/ML model (e.g., in terms of KPI value production, an entity-specific optimization, and/or according to other configurable criteria (e.g., length of use and/or training post-deployment, balancing performance at end device 130 versus performance at access device 107 and/or the wireless network more generally, etc.)) associated with a use case (e.g., MIMO) or a sub-use case (e.g., a particular number of antenna ports and layers) may not be selected in view of a higher performing AI/ML model. In this regard, access device 107 may consider end device-side performance/satisfaction scoring, network-side performance/satisfaction scoring, expected network KPIs, expected end device KPIs, as well as other contextual information (e.g., radio conditions relative to end device

130, radio conditions relative to a geographic area of relevance, congestion state, etc.). Access device 107 may select the end device-side AI/ML model and the network-side AI/ML model based on such factors, as described herein.

According to an exemplary embodiment, the model pairing service may include an AI/ML model that selects the end device-side AI/ML model and/or the network-side AI/ML model (referred to herein as an "AI/ML model selection model"). According to an exemplary embodiment, the AI/ML model selection model may be implemented according to a data-driven design. For example, the AI/ML model selection model may be data driven based on input, output, and performance label feedback, such as end device measurements, network-side measurements, KPI feedback/label (e.g., a network KPI, an end device KPI) and/or some other configured performance metric (e.g., a predefined multi-variable formula, a test score from a network operator or a third party report score, energy saving, network and/or end device resource saving, etc.). The AI/ML model selection model may be tailored based on training data labeling, augmenting, managing, and curating of the data. In this way, the AI/ML model selection of the model pairing service may be influenced towards any desired performance associated with any metric. According to other exemplary embodiments, the model pairing service may include an AI/ML model that selects the end device-side AI/ML model and/or the network-side AI/ML model according to a model-centric focus (e.g., optimizing the AI/ML model).

In response to selection of the AI/ML models to use, access device 107 may communicate the end device-side AI/ML model identifier and corresponding network-side AI/ML model identifier (e.g., that may be used for online training logistic purposes) to end device 130 via message 230, for example. According to various exemplary embodiments, the AI/ML pairing may take effect by explicit activation, after a pre-set time interval, or upon transmission or receipt of message 230, for example.

According to various exemplary embodiments, message 230 may relate to one or multiple entity-specific AI/ML model selections that may relate to one or multiple network operations, procedures, optimizations KPIs, and the like, as described herein, such as beam management, positioning, mobility, energy saving, load balancing, and so forth. The entity-specific AI/ML model may include learning-based and/or intelligence logic, such as reinforcement-based learning, unsupervised learning, semi-supervised learning, supervised learning, deep learning, artificial intelligence, and/or other types of device intelligence. The AI/ML model may include one or multiple types of models. For example, the AI/ML model may include a time series model, a forecast model, a clustering model, and/or a classification model. The model may include a tree-based algorithm, a regressive algorithm, and/or another type of AI/ML algorithm or logic, such as Naïve Bayes, K-Nearest Neighbors, decision tree, Random Forest, gradient boosting, support vector machine, clustering via embedding, a dense neural network, a convolutional neural network, a recurrent neural network, and/or the like. The AI/ML model may include an algorithm relating to parameter estimation, such as minimum mean square error (MMSE) and the like. The AI/ML model may output current and/or prospective values relating to KPIs, optimization, and/or another type of entity-specific criteria-based value.

According to various exemplary embodiments, an entity-specific network-side model may be implemented as a particular network release, a particular set of network configurations, a particular set of network behavior, a particular set of network additional information, and/or a particular way of network transmission. According to various exemplary embodiments, an entity-specific end device-side model may be implemented as a particular RF modem, a particular set of end device behavior, a particular set of end device additional information, and/or a particular way of end device transmission.

Referring to FIG. 2C, access device 107 and end device 130 may perform a network service or procedure using the selected AI/ML models 235. For example, the network service or procedure may relate to beam management, channel state, positioning, energy saving, load balancing, and so forth, as described herein.

Figure 2D:
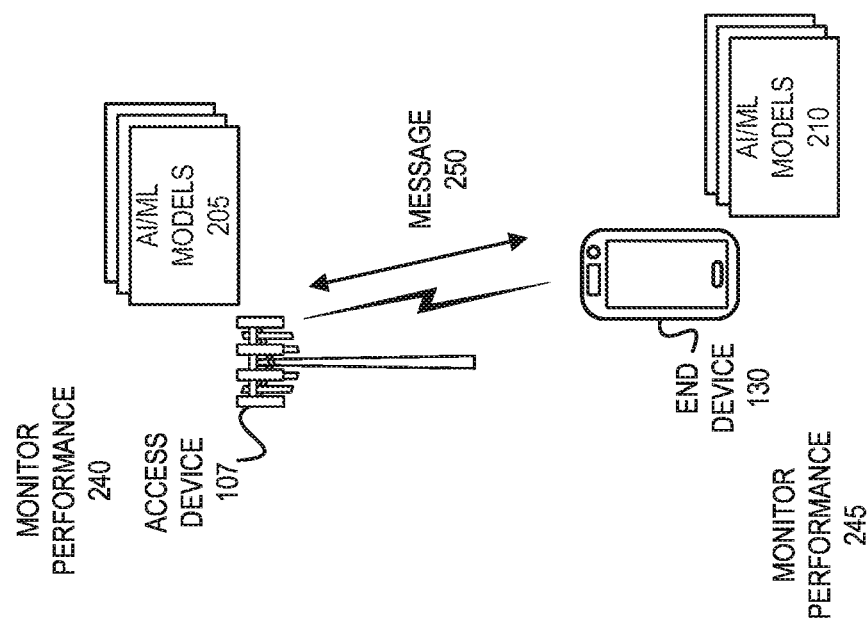

Referring to FIG. 2D, access device 107 may monitor performance 240 and end device 130 may monitor performance 245. For example, the output of the AI/ML model may be monitored and evaluated. For example, the output may include a KPI value, an optimization value, and/or other configurable data of relevance that may be subject to evaluation. According to some exemplary embodiments, access device 107 and/or end device 130 may communicate a message 250 pertaining to performance or scoring.

Referring to FIG. 2E, access device 107 may evaluate and determine an LCM action 255 based on the monitored performance. For example, access device 107 may determine whether to sustain activation of the end device-side AI/ML model and/or the network-side AI/ML model, new selection of AI/ML model, and/or other forms of LCM, as described herein.

FIGS. 2A-2E illustrate an exemplary process 200 of the learning-based network optimization service, however, according to other exemplary embodiments, the learning-based network optimization service may perform additional operations, fewer operations, and/or different operations than those illustrated and described in relation to FIGS. 2A-2E. For example, although process 200 may pertain to a RAN scenario of the learning-based network optimization service, according to other exemplary embodiments, the learning-based network optimization service may relate to entity-specific AI/ML models and other types of networks, such as core network 120 and end device and/or external network 115 and end device 130. For example, an AMF and end device 130 or a UPF and an end device 130 may perform an AI/ML model pairing service via control plane messaging or signaling, use of the selected AI/ML for a network service or procedure, and subsequent LCM. Alternatively, a MEC server and end device 130 may perform an AI/ML model pairing service, use of the selected AI/ML for a network service or procedure, and subsequent LCM.

FIG. 3 is a diagram illustrating exemplary components of a device 300 that may be included in one or more of the devices described herein. For example, device 300 may correspond to access device 107, end device 130, core device 122, and external device 117, as described herein. As illustrated in FIG. 3, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, clocks, and so forth.

Processor 310 includes one or multiple processors, microprocessors, data processors, co-processors, graphics processing units (GPUs), ASICs, controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, neural processing unit (NPUs), and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc.

Processor 310 may control the overall operation, or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, learning, model-based, etc.

Memory/storage 315 includes one or multiple memories and/or one or multiple other types of storage mediums. For example, memory/storage 315 may include one or multiple types of memories, such as, a random access memory (RAM), a dynamic RAM (DRAM), a static RAM (SRAM), a cache, a read only memory (ROM), a programmable ROM (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 315 may include a hard disk (e.g., a magnetic disk, an optical disk, a magneto-optic disk, a solid-state component, etc.), a Micro-Electromechanical System (MEMS)-based storage medium, and/or a nanotechnology-based storage medium.

Memory/storage 315 may be external to and/or removable from device 300, such as, for example, a Universal Serial Bus (USB) memory stick, a dongle, a hard disk, mass storage, off-line storage, or some other type of storing medium. Memory/storage 315 may store data, software, and/or instructions related to the operation of device 300.

Software 320 includes an application or a program that provides a function and/or a process. As an example, with reference to access device 107, software 320 may include an application that, when executed by processor 310, provides a function and/or a process of the learning-based network optimization service, as described herein. According to another example, with reference to end device 130, software 320 may include an application that, when executed by processor 310, provides a function and/or a process of the learning-based network optimization service, as described herein. Software 320 may also include firmware, middleware, microcode, hardware description language (HDL), and/or another form of instruction. Software 320 may also be virtualized. Software 320 may further include an operating system (e.g., Windows, Linux, Android, proprietary, etc.), such as operating system 204. Software 320 may include applications, libraries, AI/ML models, and the like.

Communication interface 325 permits device 300 to communicate with other devices, networks, systems, and/or the like. Communication interface 325 includes one or multiple wireless interfaces, optical interfaces, and/or wired interfaces. For example, communication interface 325 may include one or multiple transmitters and receivers, or transceivers. Communication interface 325 may operate according to a protocol stack and a communication standard.

Input 330 permits an input into device 300. For example, input 330 may include a keyboard, a mouse, a display, a touchscreen, a touchless screen, a button, a switch, an input port, speech recognition logic, and/or some other type of visual, auditory, tactile, affective, olfactory, etc., input component. Output 335 permits an output from device 300. For example, output 335 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, PaaS, etc.). Device 300 may be implemented in the same manner. For example, device 300 may be instantiated, created, deleted, or some other operational state during its life cycle (e.g., refreshed, paused, suspended, rebooted, or another type of state or status), using well-known virtualization technologies. For example, access device 107, core device 122, external device 117, and/or another type of network device or end device 130, as described herein, may be a virtualized device.

Device 300 may be configured to perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a function, an operation, or a process described herein. Alternatively, for example, according to other implementations, device 300 may be configured to perform a function, an operation, or a process described herein based on the execution of hardware (processor 310, etc.).

Figure 4:
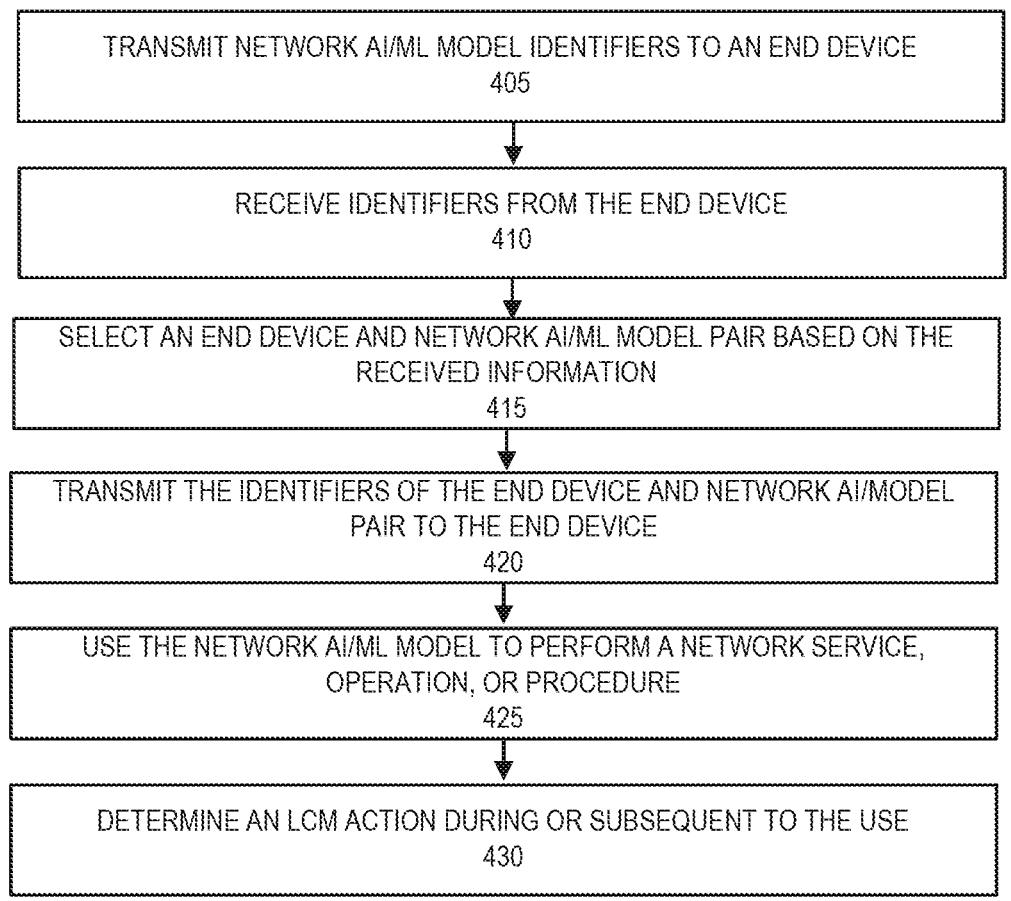
FIG. 4 is a flow diagram illustrating an exemplary process of an exemplary embodiment of the learning-based network optimization service.

FIG. 4 is a flow diagram illustrating an exemplary process 400 of an exemplary embodiment of the learning-based network optimization service. According to an exemplary embodiment, access device 107 may perform steps of process 400. According to an exemplary implementation, a processor may execute software to perform a step (in whole or in part) of process 400, as described herein. Alternatively, a step (in whole or in part) may be performed by execution of only hardware.

Referring to FIG. 4, in block 405, access device 107 may transmit network AI/ML model identifiers to end device 130. For example, access device 107 may transmit a message, such as a SIB message, an RRC message, or another type of control plane message that includes one or more instances of AI/ML service information, as described herein.

In block 410, access device 107 may receive identifiers from end device 130. For example, the identifiers may include end device AI/ML model identifiers and network AI/ML model identifiers. The end device AI/ML identifiers and/or the network AI/ML model identifiers may include or correspond to one or multiple RF modem identifiers, as described herein End device 130 may transmit a control plane message, such as an RRC message, an IS request, and the like, that may include one or more instances of AI/ML service information. The control plane message may include performance information (e.g., satisfaction score or the like scoring) relating to an AI/ML model (e.g., network-side AI/ML model, end device-side AI/ML model).

In block 415, access device 107 may select an end device and network AI/ML model pair based on the received information. For example, access device 107 may consider the combination of performance information (e.g., from both network and end device-sides), KPIs (e.g., end device and network sides), radio conditions, network-side conditions, and the like as a basis for selecting the end device and network AI/ML model pair, as described herein. According to various exemplary embodiments, access device 107 may select the end device and network AI/ML model pair using a model-centric AI/ML model or a data-driven AI/ML model, as described herein.

In block 420, access device 107 may transmit the identifiers of the end device and network AI/ML model pair. For example, access device 107 may generate and transmit a control plane message that includes the identifiers of the network AI/ML model and the end device AI/ML model which are paired, as described herein.

In block 425, access device 107 may use the network AI/ML model to perform a network service, operation, or procedure. For example, access device 107 (and end device 130) may use their respective AI/ML model of the AI/ML model pair to perform the network service, operation, or procedure that may relate to beam management, positioning, mobility, energy saving, load balancing, among other types of optimizations pertaining to wireless access, connectivity, and the like.

In block 430, access device 107 may determine an LCM action during or subsequent to the use of the network AI/ML model. For example, access device 107 (and end device 130) may monitor the performance of the KPIs and the AI/ML models during their use. Access device 107 may determine whether to sustain activation of the AI/ML model (e.g., network-side and/or end device-side), select another AI/ML model, perform a switching procedure for a newly selected AI/ML model, and so forth, as described herein.

FIG. 4 illustrates an exemplary process 400 of the learning-based network optimization service, however, according to other exemplary embodiments, the learning-based network optimization service may perform additional operations, fewer operations, and/or different operations than those illustrated and described in relation to FIG. 4.

FIG. 5 is a flow diagram illustrating an exemplary process 500 of an exemplary embodiment of the learning-based network optimization service. According to an exemplary embodiment, access device 107, external device 117, or core device 122 may perform steps of process 500. According to an exemplary implementation, a processor may execute software to perform a step (in whole or in part) of process 500, as described herein. Alternatively, a step (in whole or in part) may be performed by execution of only hardware. For purposes of description of FIG. 5, the term network device is used to refer to access device 107, external device 117, or core device 122.

In block 505, a network device may perform an AI/ML model pairing procedure that includes use of an AI/ML model identifier that correlates to an RF modem identifier of end device 130. For example, the network device may receive AI/ML service information, analyze, and select an end device and network AI/ML model pair, as described herein. The AI/ML model identifier may identify an end device-side AI/ML model or a network-side AI/ML model.

In block 510, the network device may use a network AI/ML model of an end device and network AI/ML model pair, selected based on the AI/ML model pairing procedure, to perform a network service, operation, or procedure that may relate to beam management, positioning, mobility, energy saving, load balancing, among other types of optimizations pertaining to wireless access, connectivity, and the like, as described herein.

FIG. 5 illustrates an exemplary process 400 of the learning-based network optimization service, however, according to other exemplary embodiments, the learning-based network optimization service may perform additional operations, fewer operations, and/or different operations than those illustrated and described in relation to FIG. 5. For example, the AI/ML model identifier may not correlate to the RF modem identifier but instead includes the RF modem identifier, as described herein.

FIG. 6 is a flow diagram illustrating an exemplary process 600 of an exemplary embodiment of the learning-based network optimization service. According to an exemplary embodiment, end device 130 may perform steps of process 600. According to an exemplary implementation, a processor may execute software to perform a step (in whole or in part) of process 600, as described herein. Alternatively, a step (in whole or in part) may be performed by execution of only hardware.

In block 605, end device 130 may perform an AI/ML model pairing procedure that includes use of an AI/ML model identifier that correlates to an RF modem identifier of end device 130. For example, end device 130 may transmit AI/ML service information, which includes the AI/ML model identifier, to a network device, as described herein. The AI/ML model identifier may identify an end device-side AI/ML model or a network-side AI/ML model. End device 130 may receive AI/ML service information that includes an end device and network AI/ML model pair, as described herein.

In block 610, end device 130 may use an end device AI/ML model of an end device and network AI/ML model pair, selected based on the AI/ML model pairing procedure, to perform a network service, operation, or procedure that may relate to beam management, positioning, mobility, energy saving, load balancing, among other types of optimizations pertaining to wireless access, connectivity, and the like, as described herein.

FIG. 6 illustrates an exemplary process 600 of the learning-based network optimization service, however, according to other exemplary embodiments, the learning-based network optimization service may perform additional operations, fewer operations, and/or different operations than those illustrated and described in relation to FIG. 6. For example, the AI/ML model identifier may not correlate to the RF modem identifier but instead includes the RF modem identifier, as described herein.

As set forth in this description and illustrated by the drawings, reference is made to "an exemplary embodiment," "exemplary embodiments," "an embodiment," "embodiments," etc., which may include a particular feature, structure, or characteristic in connection with an embodiment(s). However, the use of the phrase or term "an embodiment," "embodiments," etc., in various places in the description does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described regarding the processes illustrated in FIGS. 4-6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, diverse types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315. The non-transitory computer-readable storage medium may be implemented in a centralized, distributed, or logical division that may include a single physical memory device or multiple physical memory devices spread across one or multiple network devices.

To the extent the aforementioned embodiments collect, store, or employ personal information of individuals, it should be understood that such information shall be collected, stored, and used in accordance with all applicable laws concerning protection of personal information. Additionally, the collection, storage and use of such information can be subject to the consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known are expressly incorporated herein by reference and are intended to be encompassed by the claims.

What is claimed is:

1. A method comprising:

transmitting, by a network device, a first message that includes network artificial intelligence and/or machine learning (AI/ML) model identifiers, to an end device;

receiving, by the network device from the end device, a second message that includes end device AI/ML model identifiers and supported network AI/ML model identifiers, wherein at least one of the end device AI/ML model identifiers or the supported network AI/ML model identifiers include or correlate to a radio frequency (RF) modem identifier of the end device;

selecting, by the network device based on the second message, an end device and network AI/ML model pair;

transmitting, by the network device to the end device, a third message that includes identifiers of the end device and the network AI/ML model pair; and using, by the network device, the network AI/ML model of the end device and network AI/model pair to perform a network service or operation.

2. The method of claim 1, wherein the RF modem identifier indicates at least one of software or firmware release information associated with an RF modem of the end device.

3. The method of claim 1, wherein the second message further includes performance information relating to end device AI/ML models identified by the end device AI/ML model identifiers.

4. The method of claim 1, wherein the network AI/ML model is configured according to a network operator-specific optimization of a network-side key performance indicator (KPI) based on a corresponding end device-side (KPI) and an RF modem of the end device identified by the RF modem identifier.

5. The method of claim 1, wherein the selecting further comprises:

selecting, by the network device, the end device and network AI/ML model pair based on the second message, performance information associated with AI/ML models identified by the end device AI/ML model identifiers, and performance information associated with network AI/ML models identified by the network AI/ML model identifiers.

6. The method of claim 1, further comprising:

monitoring, by the network device during the use of the network AI/ML model, a network-side key performance indicator of the network AI/ML model; and determining, by the network device based on the monitoring, a life cycle management action.

7. The method of claim 1, wherein the second message is a radio resource control (RRC) message.

8. The method of claim 1, wherein the network device comprises a next generation Node B, a centralized unit (CU), or a distributed unit (DU) of a radio access network.

9. A network device comprising:
a processor, wherein the processor is configured to:
transmit a first message that includes network artificial intelligence and/or machine learning (AI/ML) model identifiers, to an end device;
receive from the end device, a second message that includes end device AI/ML model identifiers and supported network AI/ML model identifiers, wherein at least one of the end device AI/ML model identifiers or the supported network AI/ML model identifiers include or correlate to a radio frequency (RF) modem identifier of the end device;
select based on the second message, an end device and network AI/ML model pair;
transmit to the end device, a third message that includes identifiers of the end device and the network AI/ML model pair; and
use the network AI/ML model of the end device and network AI/model pair to perform a network service or operation.

10. The network device of claim 9, wherein the RF modem identifier indicates at least one of software or firmware release information associated with an RF modem of the end device.

11. The network device of claim 9, wherein the second message further includes performance information relating to end device AI/ML models identified by the end device AI/ML model identifiers.

12. The network device of claim 9, wherein to select the end device and network AI/ML model pair, the processor is further configured to:
select the end device and network AI/ML model pair based on the second message, performance information associated with AI/ML models identified by the end device AI/ML model identifiers, and performance information associated with network AI/ML models identified by the network AI/ML model identifiers.

13. The network device of claim 9, wherein the processor is further configured to:
monitor, during the use of the network AI/ML model, a network-side key performance indicator of the network AI/ML model; and
determine, based on the monitoring, a life cycle management action.

14. The network device of claim 9, wherein the network AI/ML model is configured according to a network operator-specific optimization of a network-side key performance indicator (KPI) based on a corresponding end device-side (KPI) and an RF modem of the end device identified by the RF modem identifier.

15. The network device of claim 9, wherein the second message is a radio resource control (RRC) message.

16. The network device of claim 9, wherein the network device comprises a next generation Node B, a centralized unit (CU), or a distributed unit (DU) of a radio access network.

17. A non-transitory computer-readable storage medium storing instructions executable by a processor of a network device, wherein the instructions are configured to:
transmit a first message that includes network artificial intelligence and/or machine learning (AI/ML) model identifiers, to an end device;
receive from the end device, a second message that includes end device AI/ML model identifiers and supported network AI/ML model identifiers, wherein at least one of the end device AI/ML model identifiers or the supported network AI/ML model identifiers include or correlate to a radio frequency (RF) modem identifier of the end device;
select based on the second message, an end device and network AI/ML model pair;
transmit to the end device, a third message that includes identifiers of the end device and the network AI/ML model pair; and
use the network AI/ML model of the end device and network AI/model pair to perform a network service or operation.

18. The non-transitory computer-readable storage medium of claim 17, wherein the network AI/ML model is configured according to a network operator-specific optimization of a network-side key performance indicator (KPI) based on a corresponding end device-side (KPI) and an RF modem of the end device identified by the RF modem identifier.

19. The non-transitory computer-readable storage medium of claim 17, wherein the second message further includes performance information relating to end device AI/ML models identified by the end device AI/ML model identifiers.

20. The non-transitory computer-readable storage medium of claim 17, wherein the RF modem identifier indicates at least one of software or firmware release information associated with an RF modem of the end device.

* * * * *